United States Patent
Sun et al.

(10) Patent No.: US 9,997,966 B2
(45) Date of Patent: Jun. 12, 2018

(54) STATOR FIXING STRUCTURE

(71) Applicant: ASIA VITAL COMPONENTS CO., LTD., New Taipei (TW)

(72) Inventors: Sung-Wei Sun, New Taipei (TW); Ren-Zhen Liu, New Taipei (TW); Ze-Sen Ye, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 323 days.

(21) Appl. No.: 14/876,753

(22) Filed: Oct. 6, 2015

(65) Prior Publication Data
US 2017/0098968 A1    Apr. 6, 2017

(51) Int. Cl.
*H02K 1/18* (2006.01)

(52) U.S. Cl.
CPC ......... *H02K 1/187* (2013.01); *H02K 2213/03* (2013.01)

(58) Field of Classification Search
CPC ...................................... H02K 1/187
USPC ........................................................... 310/91
See application file for complete search history.

(56) References Cited

U.S. PATENT DOCUMENTS

2004/0227420 A1* 11/2004 Lulic ..................... H02K 1/187
310/90

* cited by examiner

*Primary Examiner* — Terrance Kenerly
(74) *Attorney, Agent, or Firm* — Jackson IPG PLLC; Demian K. Jackson

(57) ABSTRACT

A stator fixing structure includes a tube and a fixing member. The tube has an outer surface, and both a stator set and the fixing member are fitted around the tube in a bottom-up sequence. The fixing member has a main body, which has a contact surface and an engaging unit. The engaging unit is circumferentially extended from the main body towards a center of the main body to form a plurality of free ends to tightly press against the outer surface of the tube. The contact surface is axially tightly in contact with the stator set to prevent the stator set from sliding.

7 Claims, 9 Drawing Sheets

STATOR FIXING STRUCTURE

FIELD OF THE INVENTION

The invention relates to the technical field of a motor, and more specifically, to a stator fixing structure that can be used in various electric motors which generate rotatable power.

BACKGROUND OF THE INVENTION

Generally speaking, a stator is fitted around a tube, which is located onto a center of a base, such that the stator is located onto the base. The tube is a hollow cylinder and has at least one bearing fitted therein. A rotor is extended through by a shaft to connect to the shaft, so the rotor is fixedly located onto the base and corresponding to the stator. The stator is fitted around the tube or located onto the base by gluing.

However, using glue to connect the stator to tube or the base has the following disadvantages: (1) additional labor time is required in the whole manufacturing process, causing higher manufacturing costs, and it is apt to glue-overflowing; (2) when one component, such as the stator, is broken, the whole structure is needed to be substituted, causing wasting much resources; and (3) the stator is heated in operation and apt to slide when being connected by gluing.

SUMMARY OF THE INVENTION

To solve the above problems, a primary object of the present invention is to provide a stator fixing structure that with a fixing member, enables a stator set to be tightly fitted around a tube and axially confined without the risk of sliding.

Another object of the present invention is to provide a stator fixing structure that can be connected to other components without the need of glue to save the time of waiting for the glue to dry.

To achieve the above and other objects, the stator fixing structure provided according to the present invention includes a tube and a fixing member. The tube has an outer surface, and both a stator and the fixing member are fitted around the tube in a bottom-up sequence. The fixing member has a main body, which has a contact surface and an engaging unit. The engaging unit is circumferentially extended from the main body towards a center of the main body to form a plurality of free ends to press against the outer surface of the tube. The contact surface is axially tightly in contact with the stator set to prevent the stator set from sliding.

In an embodiment, the free ends of the engaging unit internally define a through hole for the tube to extend through.

In an embodiment, the through hole has an inner diameter smaller than an outer diameter defined by the outer surface of the tube.

In an embodiment, the stator set has a magnetic conductive member and an insulation member.

In an embodiment, the contact surface of the main body of the fixing member is in contact with the magnetic conductive member.

In an embodiment, the contact surface of the main body of the fixing member is in contact with the insulation member.

In an embodiment, the engaging unit is slantingly extended in an opposite direction to the contact surface of the main body of the fixing member.

In an embodiment, the engaging unit includes a plurality of tongue portions or protrusions and recesses, each of which is adjacent to each tongue portion.

In an embodiment, the tongue portions and the recesses are equally spaced teeth, saw teeth, or wavy.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
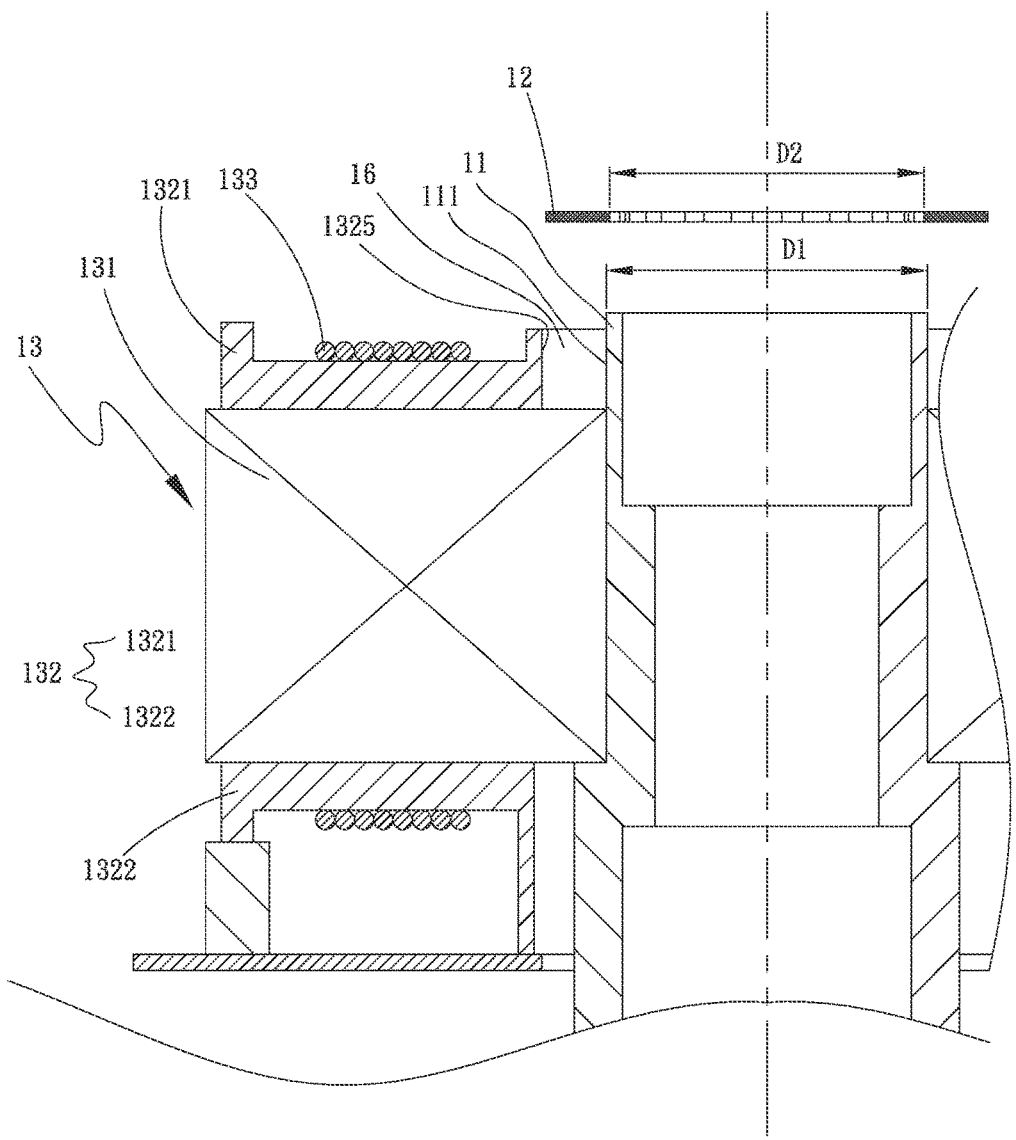
FIG. 1A is a fragmentary exploded sectional view of a stator fixing structure according to a preferred embodiment of the present invention.

The present invention will now be described with a preferred embodiment thereof and by referring to the accompanying drawings. For the purpose of easy to understand, elements that are the same in the preferred embodiments are denoted by the same reference numerals.

A stator fixing structure includes a tube and a fixing member. The tube has an outer surface, and both a stator set and the fixing member are fitted around the tube in a bottom-up sequence. The fixing member has a main body, which has a contact surface and an engaging unit. The engaging unit is circumferentially extended from the main body towards a center of the main body to form a plurality of free ends to tightly press against the outer surface of the tube. The contact surface is axially tightly in contact with the stator set to prevent the stator set from sliding.

Figure 1B:
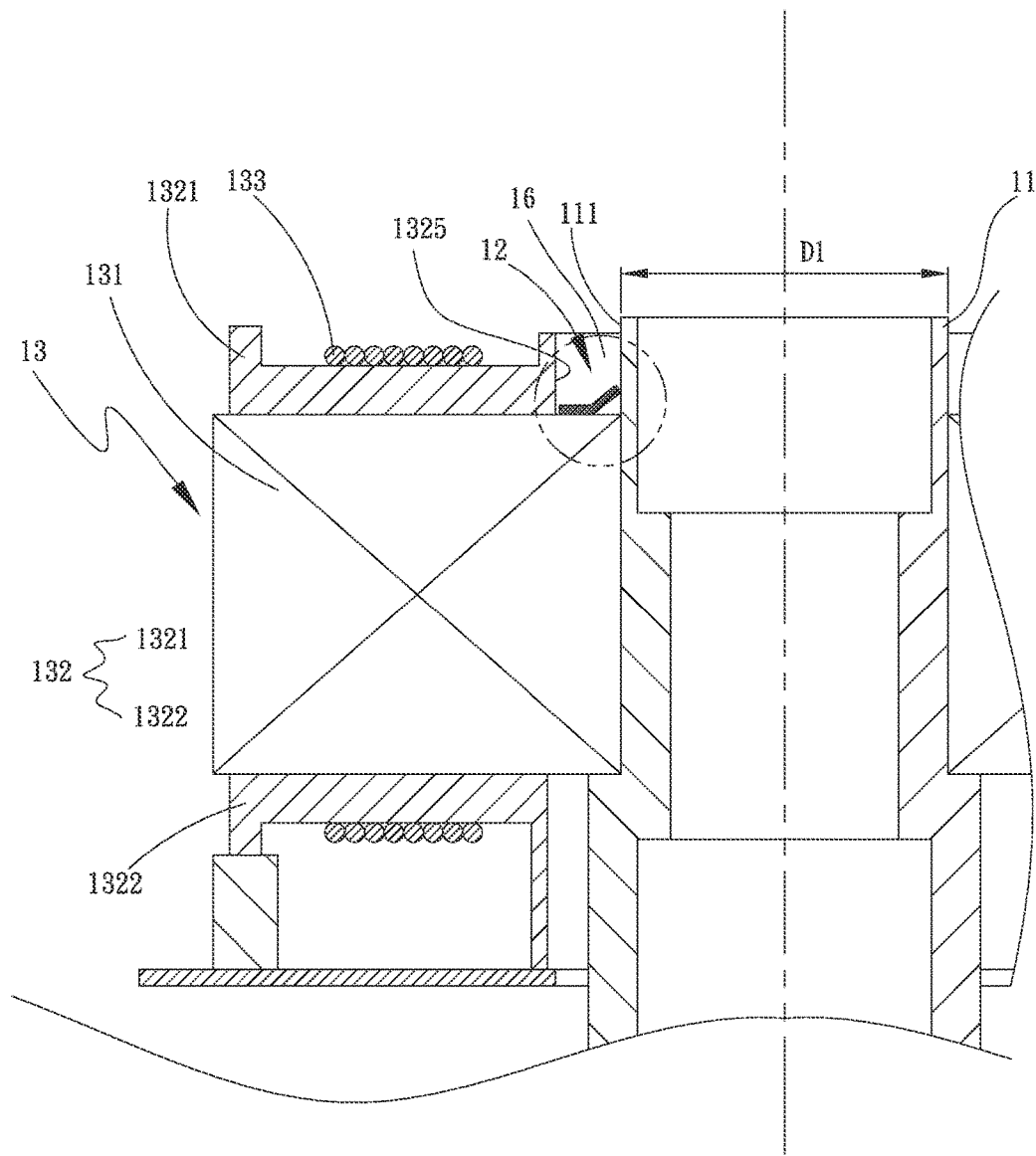
FIG. 1B is a fragmentary assembled sectional view of FIG. 1A.
Figure 1C:
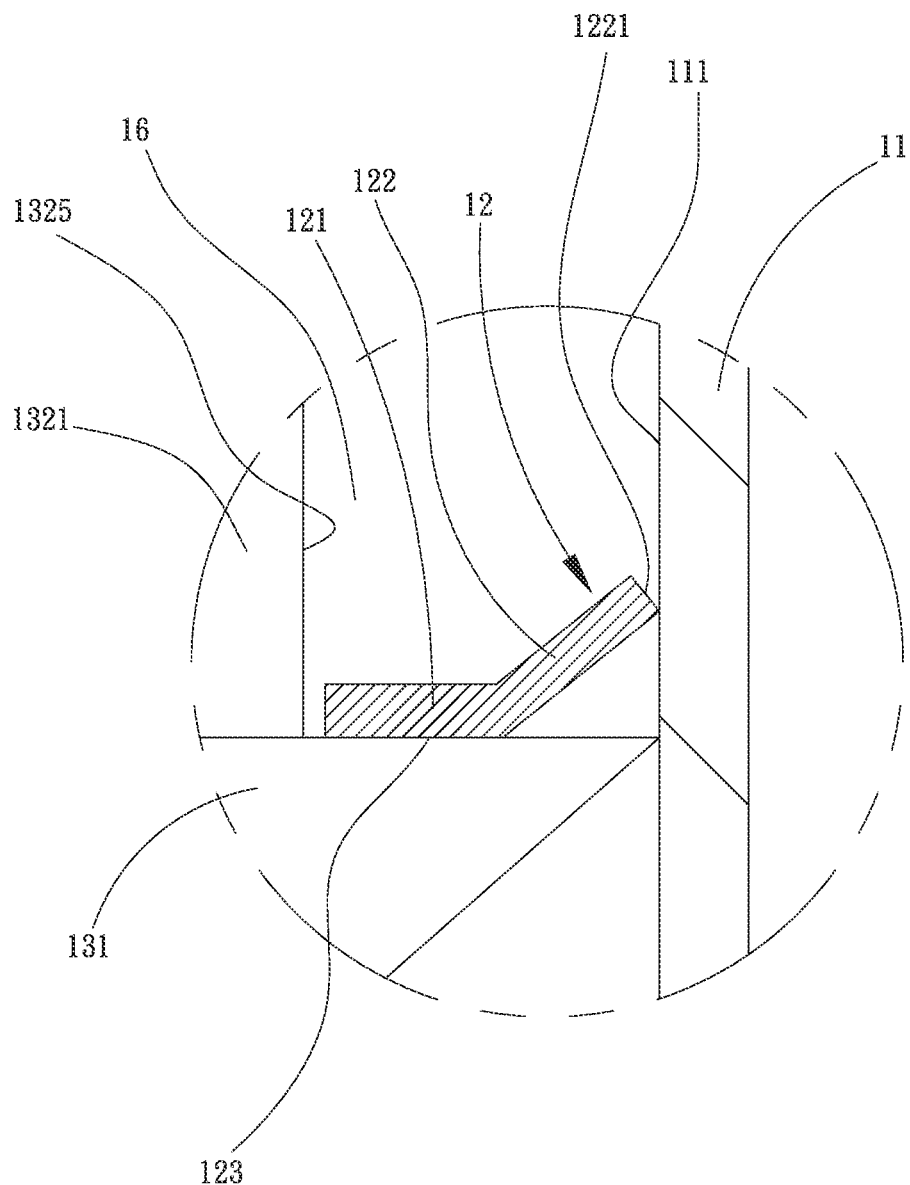
FIG. 1C is an enlarged view of the circled area of FIG. 1B.

Please refer to FIGS. 1A to 1B, which are fragmentary exploded and assembled sectional views, respectively, of a stator fixing structure according to a preferred embodiment of the present invention, and FIG. 1C, which is an enlarged view of the circled area of FIG. 1B. As shown, the stator fixing structure includes a tube 11 and a fixing member 12. The tube 11 has an outer surface 111, and defines an outer diameter D1. A stator set 13 is fitted around the outer surface 111 of the tube 111, and has a magnetic conductive member 131 and an insulation member 132. The magnetic conductive member 131 can be, for example but not limited to, a plurality of stacked silicon steel sheets. The insulation member 132 has an upper and a lower insulation portion 1321, 1322, and is wound by coils 133. The magnetic conductive member 131 is located between the upper and the lower insulation portion 1321, 1322 to insulate the insulation member 132 from the coils 133.

The insulation member 132 has a center hole 1325, which is fitted around the tube 11 and has a diameter bigger than the outer diameter D1 of the tube 11. A space 16 is defined between an inner surface of the center hole 1325 and the outer surface 111 of the tube 11. The fixing member 12 is fitted around the outer surface 111 of the tube 11 and located into the space 16.

Figure 2A:
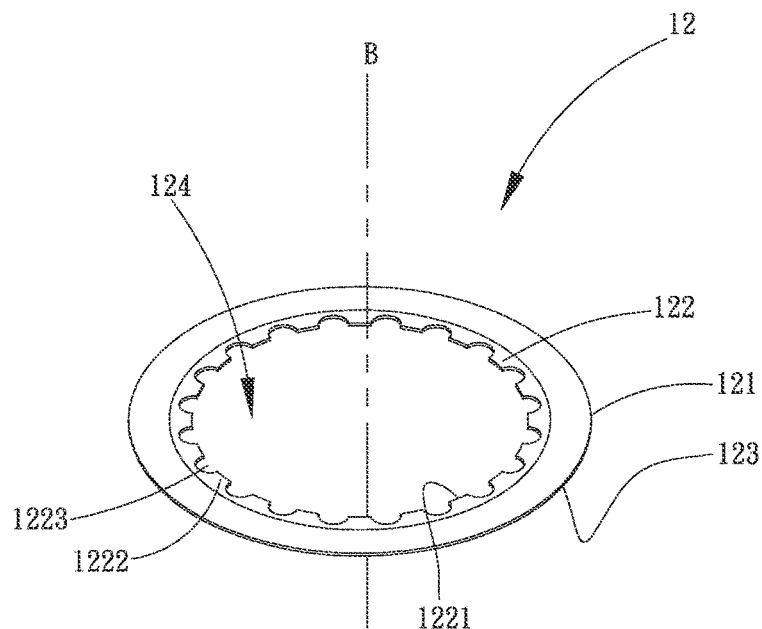
FIG. 2A is a front view of a fixing member included in the stator fixing structure according to the preferred embodiment of the present invention.
Figure 2B:
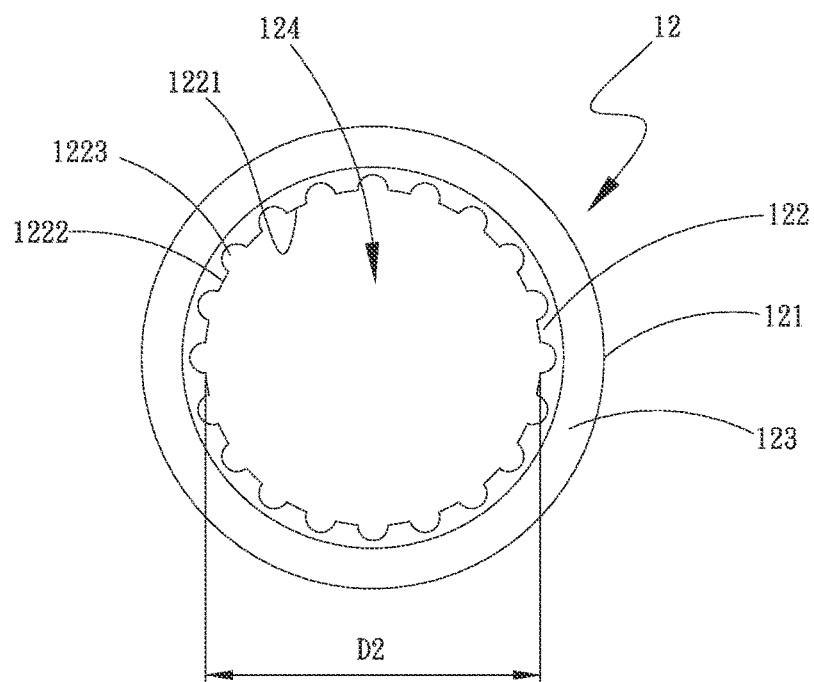
FIG. 2B is a top view of FIG. 2A.
Figure 2C:
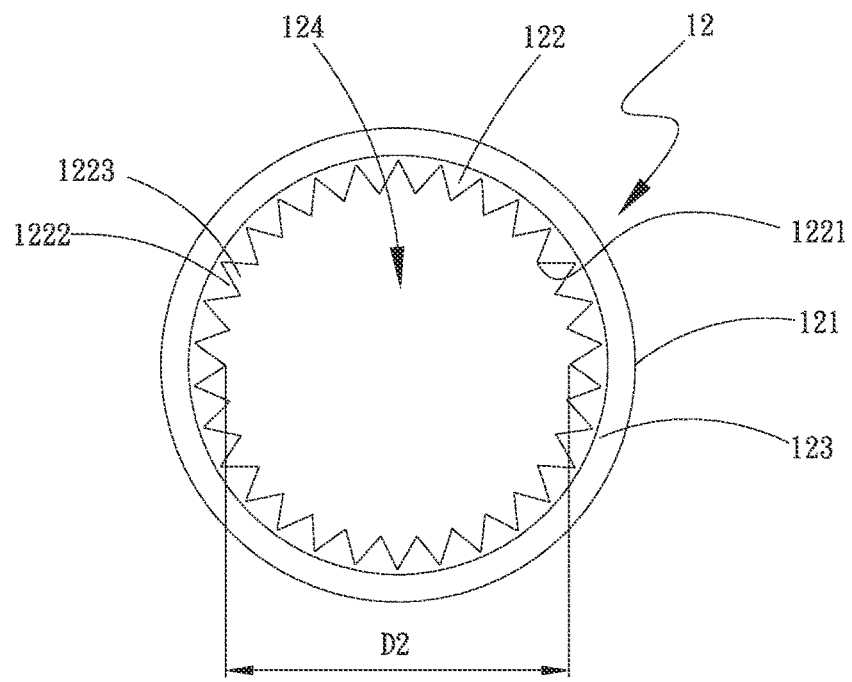
FIG. 2C to 2E are top views showing three variants of the fixing member included in the stator fixing structure according to the preferred embodiment of the present invention.
Figure 2D:
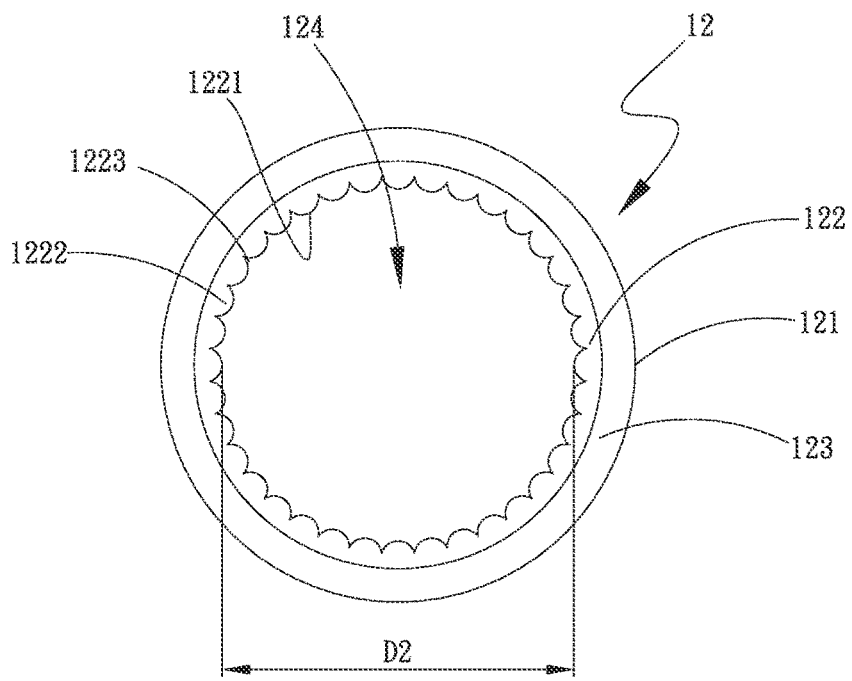
Figure 2E:
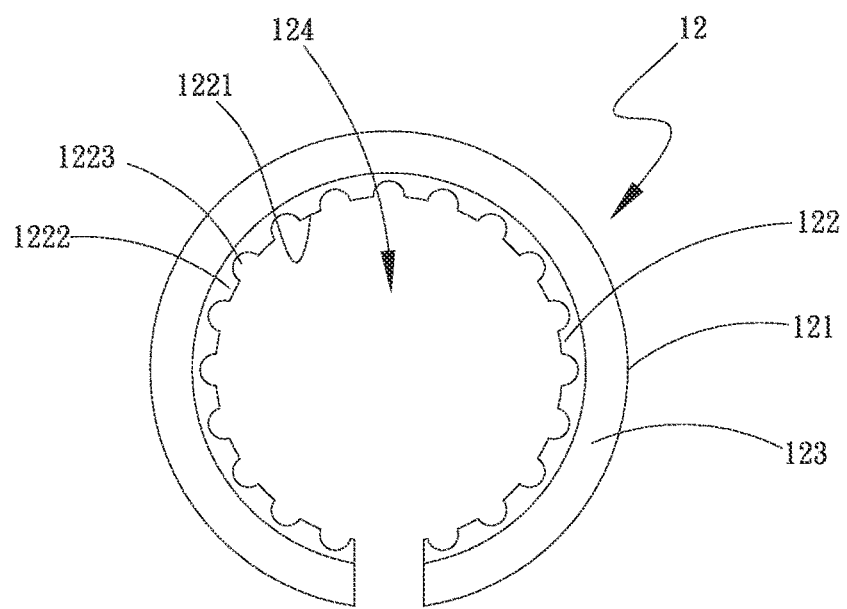

Please refer to FIGS. 2A to 2B, which are front and top views, respectively, of a fixing member included in the stator fixing structure according to the preferred embodiment of the present invention, and FIGS. 2C to 2E, which are top views showing three variants of the fixing member included in the stator fixing structure according to the preferred embodiment of the present invention, along with FIGS. 1A to 1C. As shown, the fixing member 12 has a main body 121, which has an engaging unit 122 located corresponding to the outer surface 111 of the tube 11, and a contact surface 111 located corresponding to the stator set 13. The engaging unit 122 is circumferentially extended from the main body 121 towards a center B of the main body 122. The contact surface 123 is formed on a top or a bottom side of the main body 121. In the illustrated preferred embodiment, the contact surface 123 is formed on the bottom side of the main body 121. The fixing member 12 is made of an elastic or a strengthened material, such as metal. However, in practical implementation, the fixing member 12 is an elastic round-shaped ring as shown in FIGS. 2A to 2D and a C-shaped ring as shown in FIG. 2E.

Also, the engaging unit 122 has a plurality of free ends 122, which internally define a through hole 124 for the tube 11 to extend through. The through hole 124 has an inner diameter D2 smaller than the outer diameter D1 of the outer surface 111 of the tube 11. When the fixing member 12 is downwardly fitted around the tube 11 and located into the space 16, the through hole 124 is extended through by the tube 11. When doing so, the engaging unit 122 is outwardly slantingly extended in an opposite direction to the contact surface 123 of the main body 121 of the fixing member 12, such that the free ends 1221 of the engaging unit 122 are naturally pressed against the outer surface 111 of the tube 11. Meanwhile, the contact surface 123 of the main body 121 is tightly in contact with the magnetic conductive member 131 of the stator set 13 to axially confine the stator set 13 under the fixing member 12.

More specifically, the fixing member 12 is of elastic and strengthened, and the inner diameter D2 of the through hole 124 of the fixing member 12 is smaller than the outer diameter D1 of the outer surface 111 of the tube 11, such that the engaging unit 122 is internally retracted a little bit after outwardly extended to tightly press against the outer surface 111 of the tube 11, and generates a friction between the free ends 1221 and the outer surface 111 to have the contact surface 123 axially confine the stator set 13 under the fixing member 12.

In an embodiment, the engaging unit 122 includes a plurality of tongue portions 1222 or protrusions and recesses 1223, each of which is adjacent to each tongue portion 1222. Both the tongue portions 1222 and the recesses 1223 of the engaging unit 122 are equally spaced teeth as shown in FIGS. 2A and 2B, and in a variant of the embodiment, saw teeth as shown in FIG. 2C, or wavy as shown in FIG. 2D.

Figure 3A:
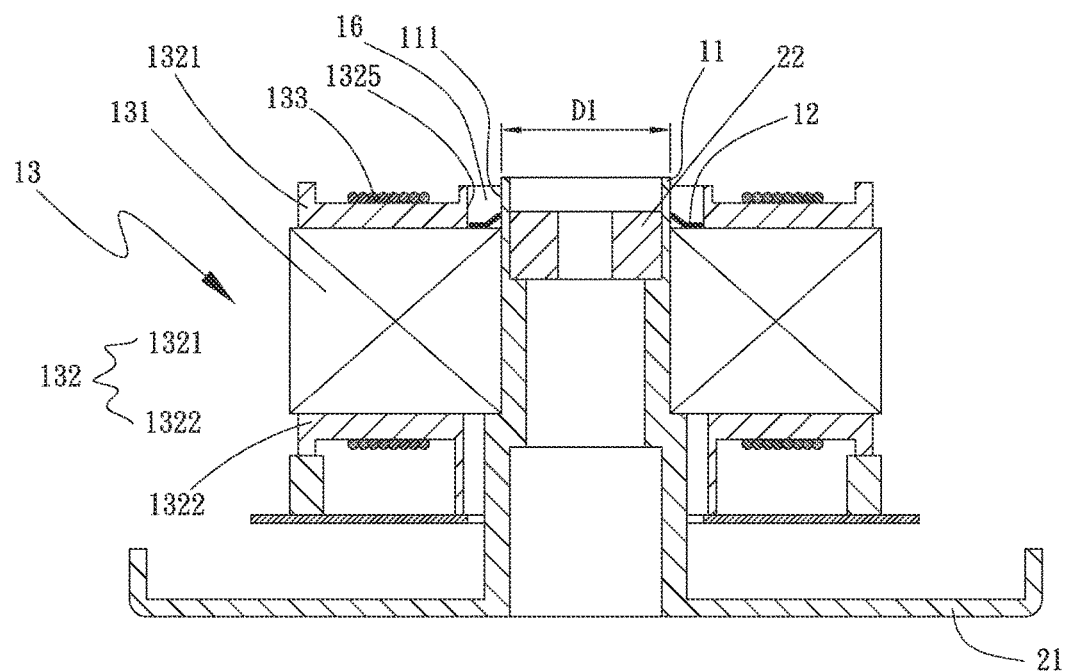
FIG. 3A is a sectional view showing a tube being located onto a base included in the stator fixing structure according to the preferred embodiment of the present invention.

Please refer to FIG. 3A, which is a sectional view showing a tube being located onto a base included in the stator fixing structure according to the preferred embodiment of the present invention. The tube 11 has at least one bearing fitted therein and is a hollow cylinder located to a center of a base 21.

Figure 3B:
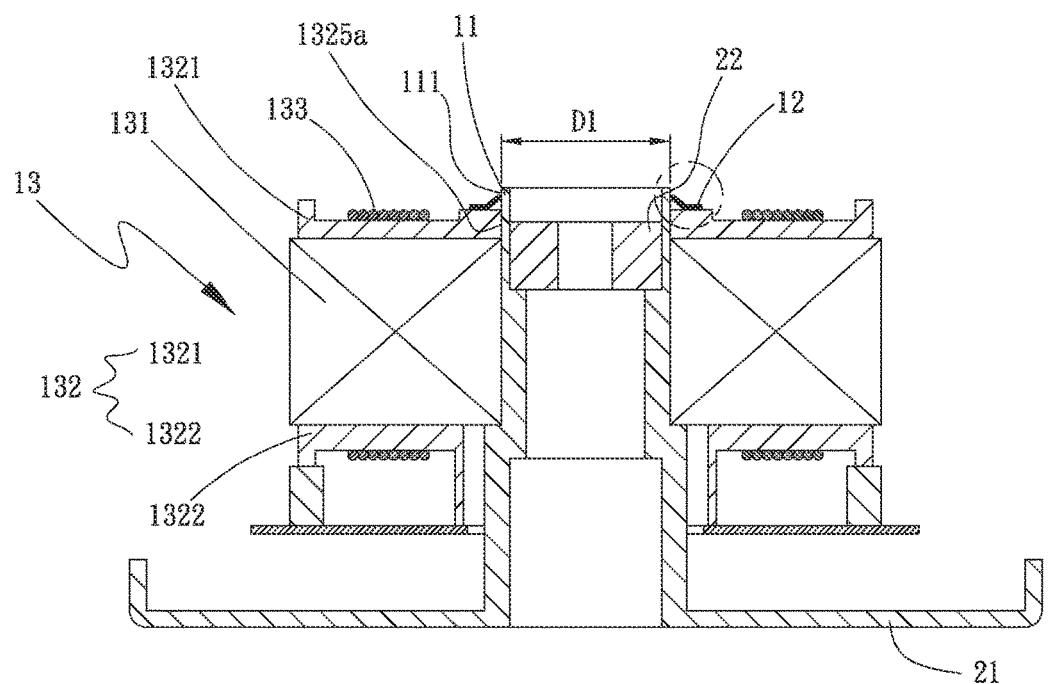
FIG. 3B is a variant of the stator fixing structure according to the preferred embodiment of the present invention.
Figure 3C:
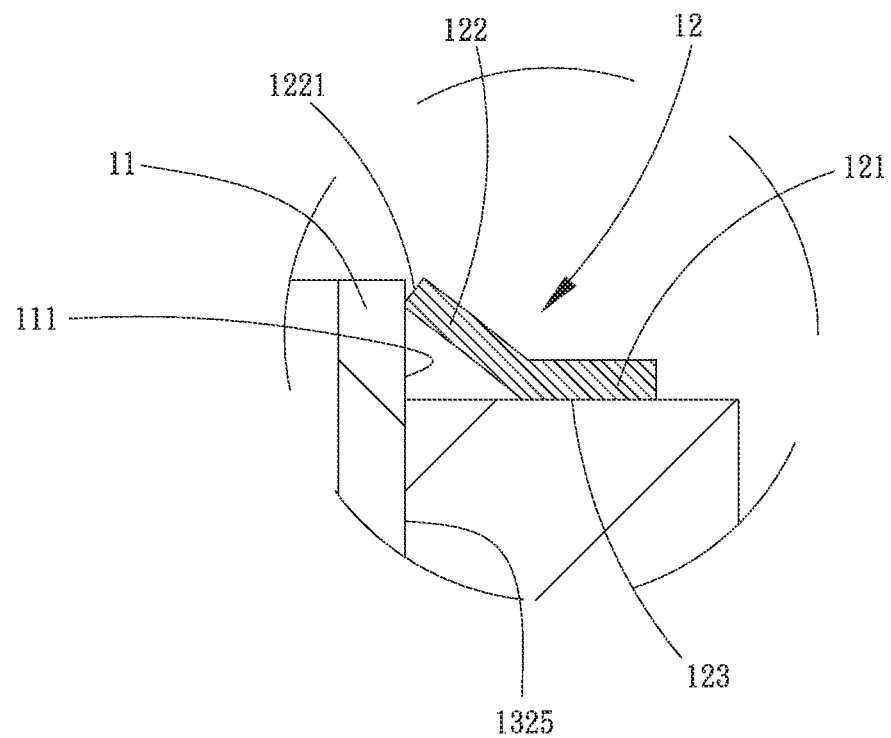
FIG. 3C is an enlarged view of the circled area of FIG. 3B.

Please refer to FIG. 3B, which is a variant of the stator fixing structure according to the preferred embodiment of the present invention. In an embodiment, the insulation member 132 has a center hole 1325a, which has a diameter equal to the outer diameter D1 of the tube 11, and an inner surface next to the outer surface 111 of the tube 11. The fixing member 12 is fitted around the outer surface 111 of the tube 11 and located onto the upper insulation portion 1321 of the insulation member 13 as shown in FIG. 3B, and the contact surface 123 of the main body 121 is tightly in contact with a top side of the lower insulation portion 1321 of the insulation member 13, such that the contact surface 123 is axially pressed against the stator set 13 under the fixing member 12.

Figure 4:
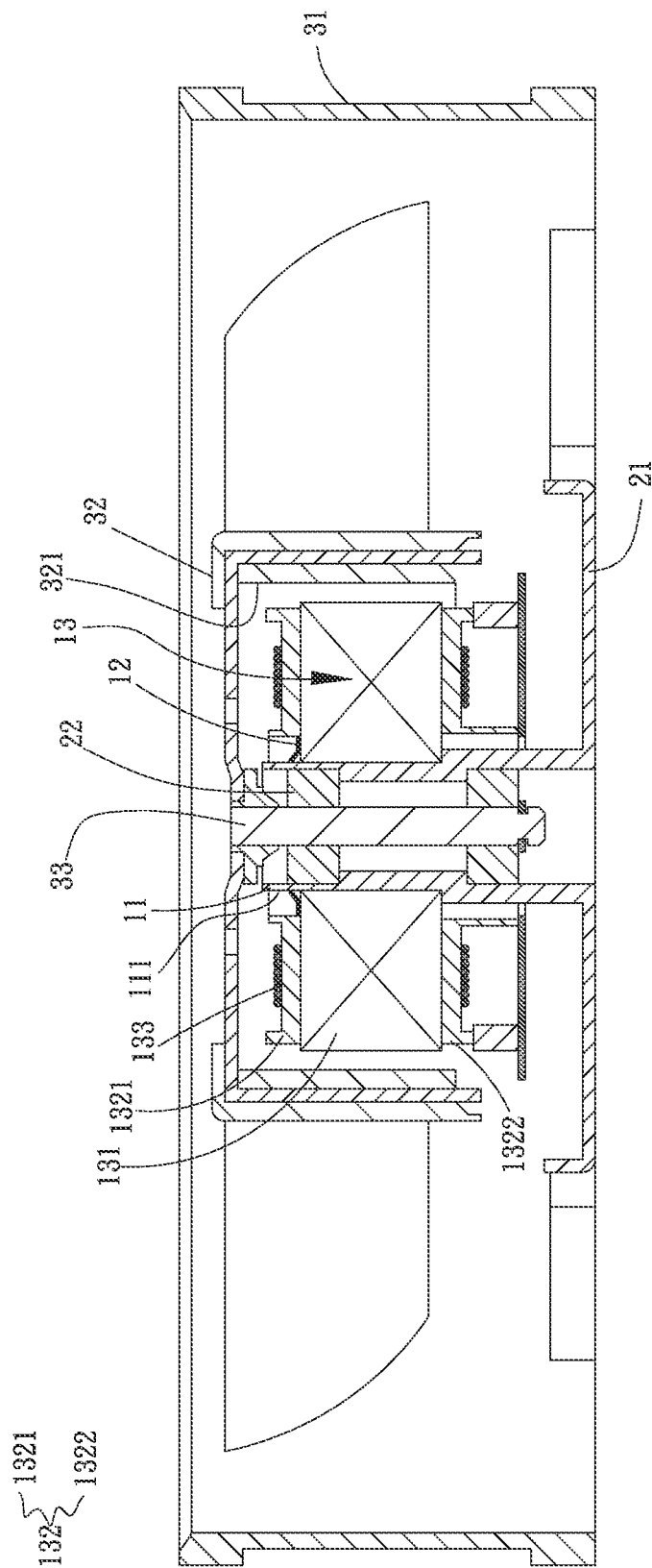
FIG. 4 is an example of use of the stator fixing structure according to the preferred embodiment of the present invention.

Referring to FIG. 4, which is an example of use of the stator fixing structure according to the preferred embodiment of the present invention, as shown, the base 21 is located in a center of a fan frame 31, and a shaft 33 is extended through the bearing 22 in the tube 11 to hold a fan wheel 32 in the fan frame 31. The fan wheel 32 has a magnetic ring 321 provided therein and located corresponding to the stator set 13. When a fan if turned on, the stator set 13 is magnetically inducted by the magnetic ring 321 to rotate relative to the fan wheel 21 to make the stator set 13 vibrated. And in the mean time, the contact surface 123 of the fixing member 12 is axially tightly in contact with the stator set 13 to prevent the stator set 13 from sliding or departing.

In brief, the stator fixing structure according to the present invention has the following advantages: with the fixing member 12, the stator set 13 is tightly fitted around the tube 11 and axially confined without the risk of sliding and the need of glue, and further save the time of waiting for the glue to dry and the risk of glue-overflowing.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A stator fixing structure, comprising:
   a tube having an outer surface defining an outer diameter, and a stator set being fitted around the outer surface, the stator set having a magnetic conductive member and an insulation member, the insulation member having a center hole, an upper insulation portion and a lower insulation portion, the center hole having a diameter equal to the outer diameter of the tube and an inner surface next to the outer surface of the tube; and
   a fixing member being fitted around the outer surface of the tube to axially fix the stator set thereunder, and having a main body, which has an engaging unit and a contact surface; the engaging unit being circumferentially extended from the main body towards a center of the main body to form a plurality of free ends to press against the outer surface of the tube; and the contact surface being axially tightly in contact with the stator set to prevent the stator set from sliding; and
   wherein the fixing member is located on the upper insulation portion of the insulation member, the contact surface of the main body of the fixing member being tightly in contact with a top side of the upper insulation portion of the insulation member and axially pressed against the stator set under the fixing member.

2. The stator fixing structure as claimed in claim 1, wherein the free ends of the engaging unit internally define a through hole for the tube to extend through.

3. The stator fixing structure as claimed in claim 2, wherein the through hole has an inner diameter smaller than the outer diameter of the tube.

4. The stator fixing structure as claimed in claim 3, wherein the engaging unit is slantingly extended in an opposite direction to the contact surface of the main body of the fixing member.

5. The stator fixing structure as claimed in claim 4, wherein the engaging unit includes a plurality of tongue portions or protrusions and recesses, each of which is adjacent to each tongue portion.

6. The stator fixing structure as claimed in claim 5, wherein the tongue portions and the recesses are equally spaced and has a configuration selected from the group of teeth, saw teeth, and wavy.

7. The stator fixing structure as claimed in claim 1, wherein the fixing member is selected from the group of an elastic round-shaped ring and a C-shaped ring.

* * * * *